(12) United States Patent  (10) Patent No.: US 8,839,124 B2
Justiza  (45) Date of Patent: Sep. 16, 2014

(54) APPARATUS FOR CONFIGURING A DIAGNOSTICS MODULE FOR AN INDUSTRIAL PLANT

(75) Inventor: Ryan Justiza, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 152 days.

(21) Appl. No.: 13/566,185

(22) Filed: Aug. 3, 2012

(65) Prior Publication Data

US 2014/0040793 A1    Feb. 6, 2014

(51) Int. Cl.
*G06F 3/14* (2006.01)
(52) U.S. Cl.
USPC ........... 715/763; 715/700; 715/867; 709/205; 700/110; 707/602
(58) Field of Classification Search
CPC .................................... G06F 3/14; G06F 3/17
USPC .................. 715/200–277, 700–867; 700/110, 700/701–866; 709/201–229; 705/50–79; 345/30–111; 707/602
See application file for complete search history.

(56) References Cited

U.S. PATENT DOCUMENTS

2004/0153509 A1*   8/2004   Alcorn et al. ................. 709/205
2012/0303150 A1*  11/2012   Krishnaswamy et al. ..... 700/110
2013/0212060 A1*   8/2013   Crouse et al. ................. 707/602

* cited by examiner

*Primary Examiner* — Ruay Ho
(74) *Attorney, Agent, or Firm* — Westerman, Hattori, Daniels & Adrian, LLP

(57) ABSTRACT

An apparatus for configuring a diagnostics module for an industrial plant includes an application module, which is configured to run on a computer and includes a graphics builder. The graphics builder includes a workspace configured to present a display area on a monitor of the computer, the display area configured to be shown by the diagnostics module on a client machine, and graphics tools configured to be manipulated via at least one user input device of the computer for customization of the display area.

9 Claims, 5 Drawing Sheets

APPARATUS FOR CONFIGURING A DIAGNOSTICS MODULE FOR AN INDUSTRIAL PLANT

FIELD OF THE INVENTION

The invention relates to an apparatus for configuring a diagnostics module for an industrial plant and particularly, though not exclusively, relates to configuring a diagnostics module in a suite of services capable of running a continuous plan-do-check-act cycle provided for monitoring plant equipment in the industrial plant.

BACKGROUND

Industrial plant monitoring systems include conventional systems based on repairing defective equipment, time-based equipment maintenance systems, and also systems that continuously run a plan-do-check-act cycle such as the InsightSuiteAE (ISAE) services solution provided by Yokogawa Electric Corporation, which includes a diagnostics module for providing equipment performance information to users. The diagnostics module typically comprises a number of diagnostics, each diagnostic being configured to provide specific information about particular pieces of equipment or groups of equipment in the industrial plant to users of the diagnostics module.

An exemplary screen shot of a display on a client machine shown to a user by an example of such a diagnostics module is shown in FIG. 1 (prior art). The display is in the form of a window 100 shown on a monitor of the client machine. A first panel 110 in the left side of the window 100 shows a list 112 of pieces of equipment or devices 102, 103, 104. Each device 102, 103, 104 is selectable by use of a pointer controlled by a user-operated input device such as a mouse or keyboard. Diagnostics information of a selected device 102 is shown in a second panel 120 in the right side of the window 100. The second panel 120 may display the diagnostics information in a plurality of tabs 122, 123, 124, the number of tabs depending on the amount of information that is to be displayed. In each tab 122, 123, 124, information about the selected device 102 may be displayed in various forms. For example, an upper left area 131 in a tab 122 may show numerical values of parameters associated with the selected device 102, while an upper right area 132 may provide a visual representation of the parameter values in the form of bar charts. A lower area 133 may show historical data for the selected device 102 in the form of a trend chart.

What and how information is displayed by the diagnostics module in the window 100 is configured by programmers of the systems provider (for example progammers of Yokogawa Electric Corporation) who implement the diagnostics module for end users. Accordingly, whenever changes to the display are required, such as when the devices to be monitored are changed, added or removed, or when the information to be displayed is changed, the programmers are tasked to provide a new release of the diagnostics module in order to meet the changed needs of the users. This can be a slow and inconvenient process, resulting in periods where equipment monitoring and diagnostics is sub-optimal whenever there has to be a wait for a new release of the diagnostics module to be ready, that incorporates the necessary modifications configured by the programmers.

SUMMARY OF THE INVENTION

According to a first exemplary aspect, there is provided an apparatus for configuring a diagnostics module for an industrial plant, the apparatus comprising an application module configured to run on a computer, the application module comprising a graphics builder; the graphics builder comprising a workspace configured to present a display area on a monitor of the computer, the display area configured to be shown by the diagnostics module on a client machine, and graphics tools configured to be manipulated via at least one user input device of the computer for customization of the display area.

The application module may further comprise a logics composer configured for a user to edit logics used to derive the information to be shown in the display area on the client machine.

The logics composer may comprise an equation builder having input area configured for editing an equation used in the logics and having editing tools configured to be manipulated via at least one user input device of the computer for editing the equation.

The logics composer may further comprise a logic building area and a logic toolbox configured to be manipulated via at least one user input device of the computer for graphically building a logic block using an output variable defined by the equation and for graphically defining a logic workflow using the logic block.

The display area may contain a number of data areas and customization may be selected from at least one of the group consisting of: creating a data area, changing a size of a data area, moving a data area to a different location within the display area, changing a color of a data area, changing a font of text associated with a data area, changing a font size of text associated with a data area, and removing a data area.

The graphics builder may be configured to allow customization of the display area to show real-time data, historical data, calculated data and threshold or manual data.

The graphics builder may be configured to link available parameters with a compatible data area.

The application module may further comprise a diagnostic identity description module configured to contain definitions used in the diagnostics module.

The diagnostic identity description module may be configured to allow a user to define names of input parameters, output parameters, calculated parameters that are referenced by the graphics builder and the logics composer.

BRIEF DESCRIPTION OF THE DRAWINGS

In order that the invention may be fully understood and readily put into practical effect there shall now be described by way of non-limitative example only exemplary embodiments of the present invention, the description being with reference to the accompanying illustrative drawings.

In the drawings.

DETAILED DESCRIPTION OF THE EXEMPLARY EMBODIMENTS

An exemplary apparatus 10 for configuring a diagnostics module for an industrial plant 1000 will be described with reference to FIGS. 2 to 4 below.

Throughout the specification, the terms 'edit' and 'editing' are used to mean creating anew as well as modifying something existing. Similarly, the terms 'customize' and 'customizing' are used to mean creating anew as well as modifying something existing.

Figure 2:
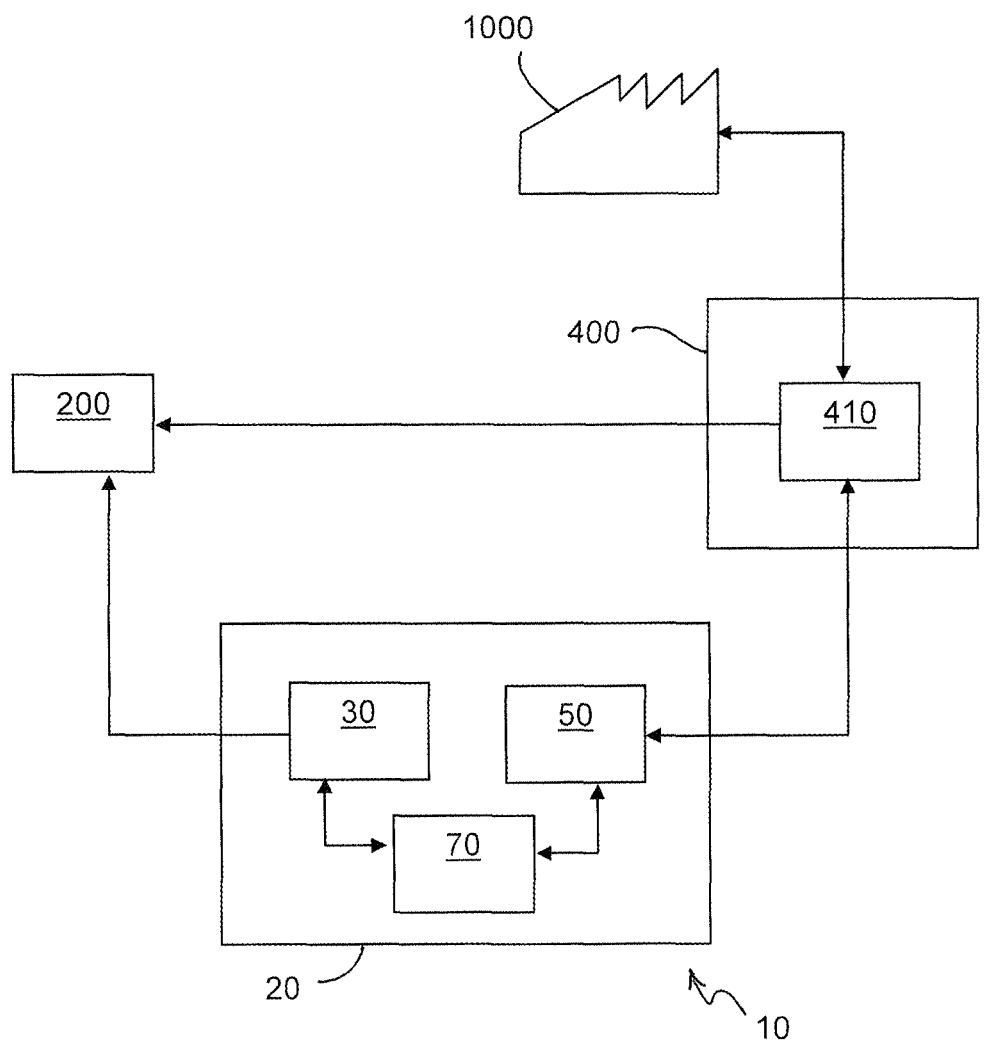
FIG. 2 is an architectural diagram of the present invention.
Figure 3:
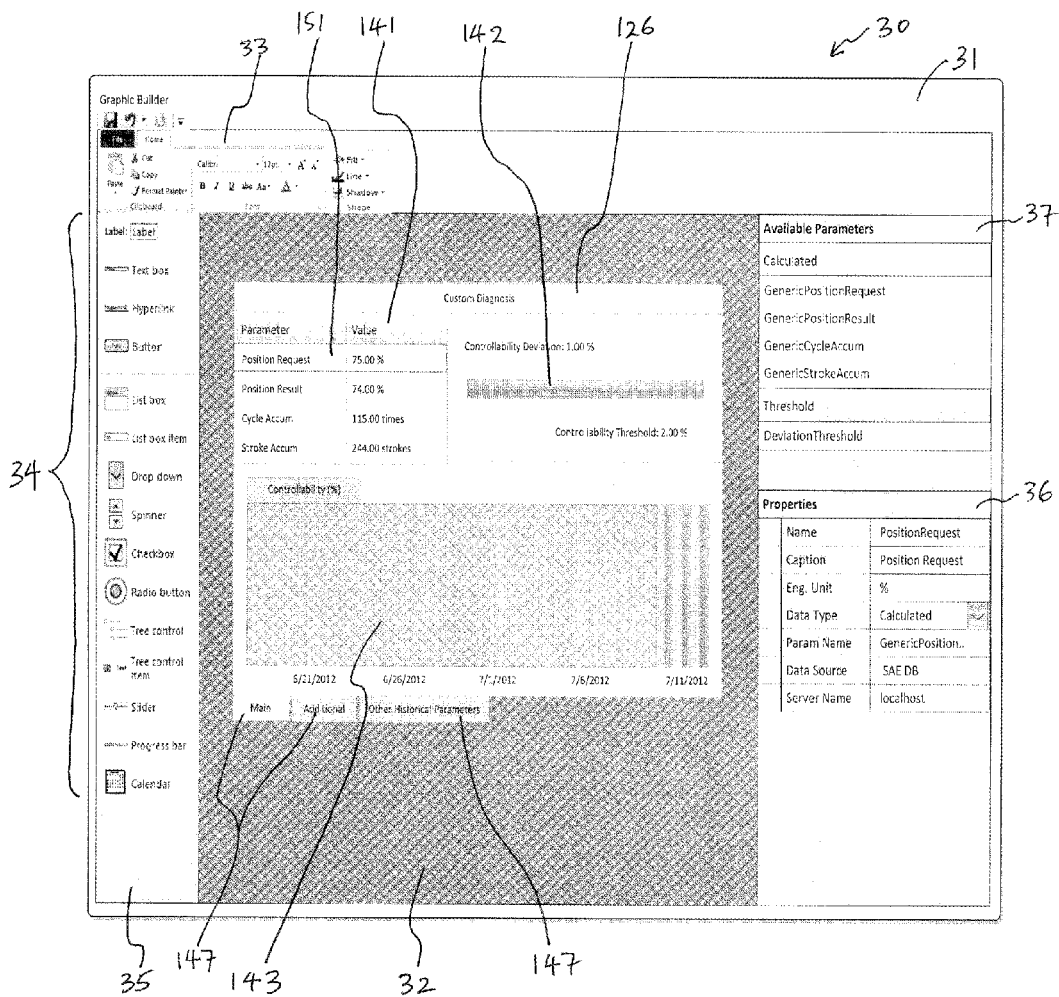
FIG. 3 is an exemplary screen shot of an exemplary graphics builder of the present invention.

As shown in the architectural diagram of FIG. 2, the apparatus 10 comprises an application module 20 that is run on a computer (not shown) and manipulated by a user such as a service engineer, using various input devices such as a mouse and a keyboard (both not shown). Using the application module 20, the user configures a diagnostics module containing various diagnostics by customizing the display and information that is shown by the diagnostics module on the client machine 200. This may be achieved by creating a new diagnostic from scratch or by modifying and building upon an existing diagnostic, or both.

The application module 20 comprises a graphics builder 30. The graphics builder 30 is configured for the user to customize through a user interface how information is shown in the diagnostics module when the diagnostics module is run on a client machine 200. In the preferred embodiment, such customizations are created and saved as dynamic link library (dll) files that are dynamically loaded by the diagnostics module to direct how information is shown on the client machine 200.

Figure 1:
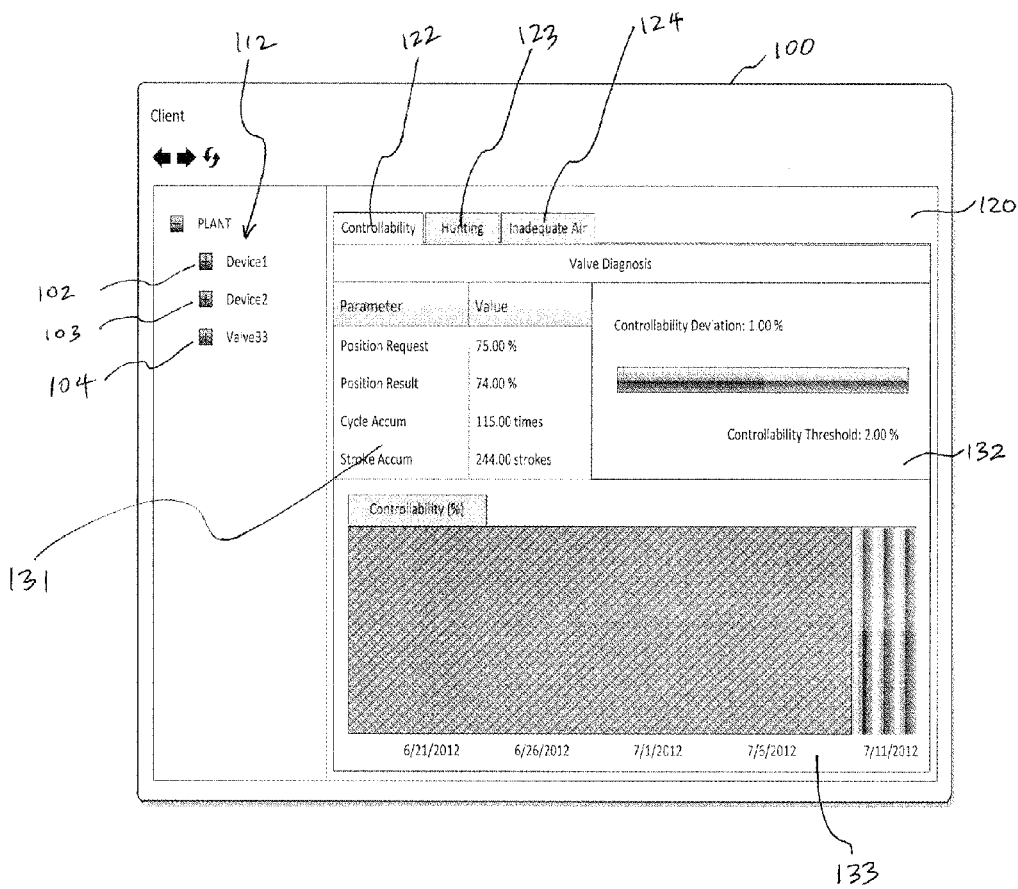
FIG. 1 (prior art) is an exemplary screen shot of a display of a diagnostics module.

The graphics builder 30 is preferably accessed by the user via a window 31 that comprises a workspace 32 in which at least a part of a display window of a diagnostics module is presented. For example, as shown in FIG. 3, a display area 126 that is to show diagnostics information of a specific device in a display window of the diagnostics module is presented in the workspace 32. For example, this display area 126 may be shown as a tab in a window by the diagnostics module if the diagnostics module has a configuration of the type shown in FIG. 1 (prior art).

A standard toolbar 33 is preferably provided for performing standard functions such as saving, copying and pasting, changing font sizes and colours and so on. Components 34 are also provided in the graphics builder 30 for customization of the display area 126. The terms "customization" and "customize" as used throughout the specification include creating from scratch a new display area 126 as well as modifying an existing display area 126. The components 34 are preferably provided in a control toolbox 35 and are configured to be dragged and dropped onto various data areas 141, 142, 143 of the display area 126. The components 34 are configured to be arranged to create a desired display area 126. In this way, the user can customize in an easy, rapid and intuitive manner how the various data areas 141, 142, 143 will appear when the display area 126 is eventually shown in the diagnostics module on the client machine 200. The data areas 141, 142, 143 may be in the form of text boxes, list boxes, bar charts, trend charts and so on.

The data areas 141, 142, 143 in the display area 126 show information about the equipment in the industrial plant 1000 when the diagnostics module is run on the client machine 200. The graphics builder 30 is preferably configured to allow customization of the data areas 141, 142, 143 and/or the display area 126 to show current information as well as historical information. This may be done by linking available parameters such as real-time, calculated, threshold and/or historical data with the relevant data areas 141, 142, 143. For example, to edit a value of a parameter in a data area 141, the user may select a particular item 151 of the data area 141 in the workspace 32. A properties pane 36 is configured to allow properties of the item 151 such as its engineering units, data type, data source, text and so on to be edited. A list of available parameters 37 is preferably also provided for the user to select where data for the item 151 is to be obtained from. The available parameters 37 are preferably sorted and grouped by data type. Data types may include real-time data, historical data, calculated data, and threshold or manually fixed data. Data source may depend on the data type selected. The user should enter a name of the parameter from a database where this data is to be obtained. Depending on the type of data area 141, selected, it is envisaged that the user may only specify certain data types associated with the data area 141. For example, where the data area 141 is a text box, only certain data types such as real-time, and calculated data, but not historical data, are available for selection to be shown.

It should be noted that the information that is shown on the display area 126 on the client machine 200 is normally derived from data obtained from the industrial plant 1000. Data sources may include but are not limited to an ISAE database, various OPC data sources, Excel/CSV data, SQLLite/SQL Server and so on. The data is further processed by logical functions that may include equations, formulas, and logical block building in order to derive the information to be shown.

Customization of the display area 126 therefore may include, and is not limited to, creating a new display area 126, moving one or more selected data areas 141, 142, 143 to different locations within the display area 126; changing the size of each data area 141, 142, 143; changing colors, fonts and font sizes associated with each data area 141, 142, 143; removing and/or adding data areas 141, 142, 143 to the display area 126; defining an input data source that will be displayed in each data area 141, 142, 143; grouping related data together in tabs 147, such as having a "main" and an "additional" tab; adding new tabs to present information in different ways, for example having two or more line charts of different parameters; customizing display formats for parameter values, such as defining a number of decimal places to be shown, showing or hiding engineering units, changing date/time formats; specifying default data values; adding or removing historical parameters from line charts; using other kinds of charts to display information besides standard charts and customizing these charts according to user needs; changing label texts, titles or headers; and so on, depending on user requirements. In the preferred embodiment, customization involves the user using a drag-and-drop method to select data areas and specify parameters to configure the display area 126 according to the user's requirements.

Depending on the modifications made during customization of the display area 126, the information to be shown may accordingly need to be modified. Modifying information involves editing existing information and/or adding new information. For example, when a new device has been added to the industrial plant 1000 and diagnostics are created for it, information about the new device has to be added and the display area 126 has to be accordingly configured to show the added information in a desired display.

The application module 20 thus preferably also comprises a logics composer 50 configured for a user to edit logics used to derive the information to be shown in the display area 126. Preferably, the logics composer 50 is configured to allow the user to edit logics dynamically, as will be described in greater detail below.

Figure 4A:
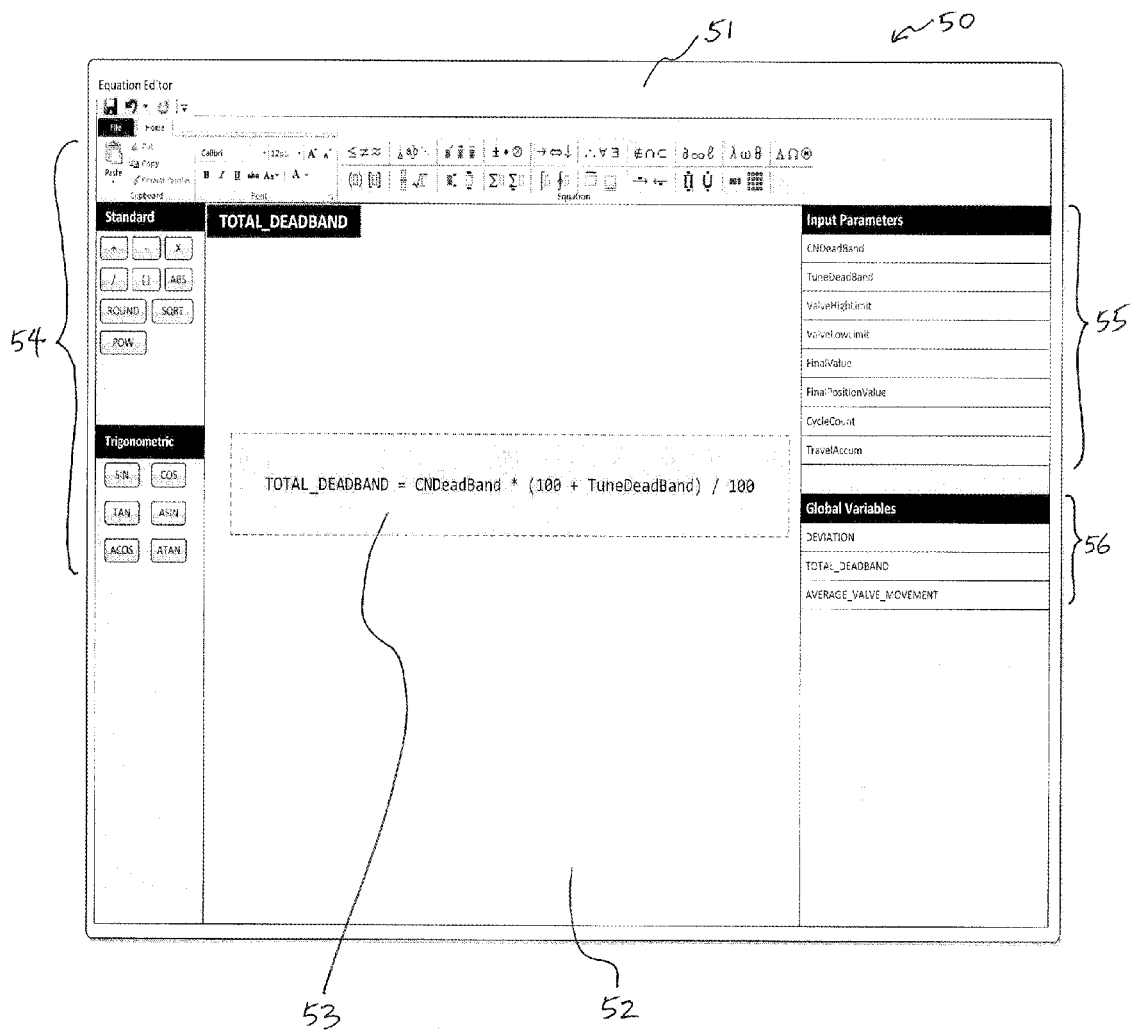
FIG. 4 is an exemplary screen shot of an exemplary logics composer of the present invention.

As shown in FIG. 4a, the logics composer 50 comprises an equation builder 51 that comprises an input area 52 in which equations or formulas 53 are shown and edited. The input area 52 is configured for the user to edit or type input parameters in order to formulate necessary expressions. A list of all the input parameters 55 available for a particular diagnostic being edited is preferably provided to be used in the expression being created. Editing tools 54 of mathematical operators, functions, basic formulas, symbols, notations, common expressions and so on are provided for building the necessary expression. The editing tools 54 are configured to be manipulated via at least one user input device of the computer, such as a mouse and/or a keyboard For example, an equation or formula 53 may be displayed as a graphical, interactive equation 53 in the input area 52 upon clicking an appropriate editing tool 54. Different parts of the equation 53 can be selected to specify their input data. Different equations can be combined. The equation or formulas utilize data obtained from the industrial plant 1000 in order to define specific calculations to formulate an output variable to be used in a logic module 61 of the logics composer 50. Using the equation builder 51, different output variables 56 may be created, wherein each variable 56 is configured to be usable anywhere in further expressions. The data obtained from the industrial plant 1000 may comprise values such as device outputs or equipment readings that are necessary for deriving the information associated with a particular diagnostic. Data obtained from the industrial plant 1000 are normally stored in a database 410 of the server 400.

The equation builder 51 is preferably also configured to allow the user to create different aggregate functions or to create their own functions for summarizing historical data gathered. Exemplary aggregate functions include sum of historical data, average of historical data, maximum value of historical data, standard deviation of historical data and so on.

Figure 4B:
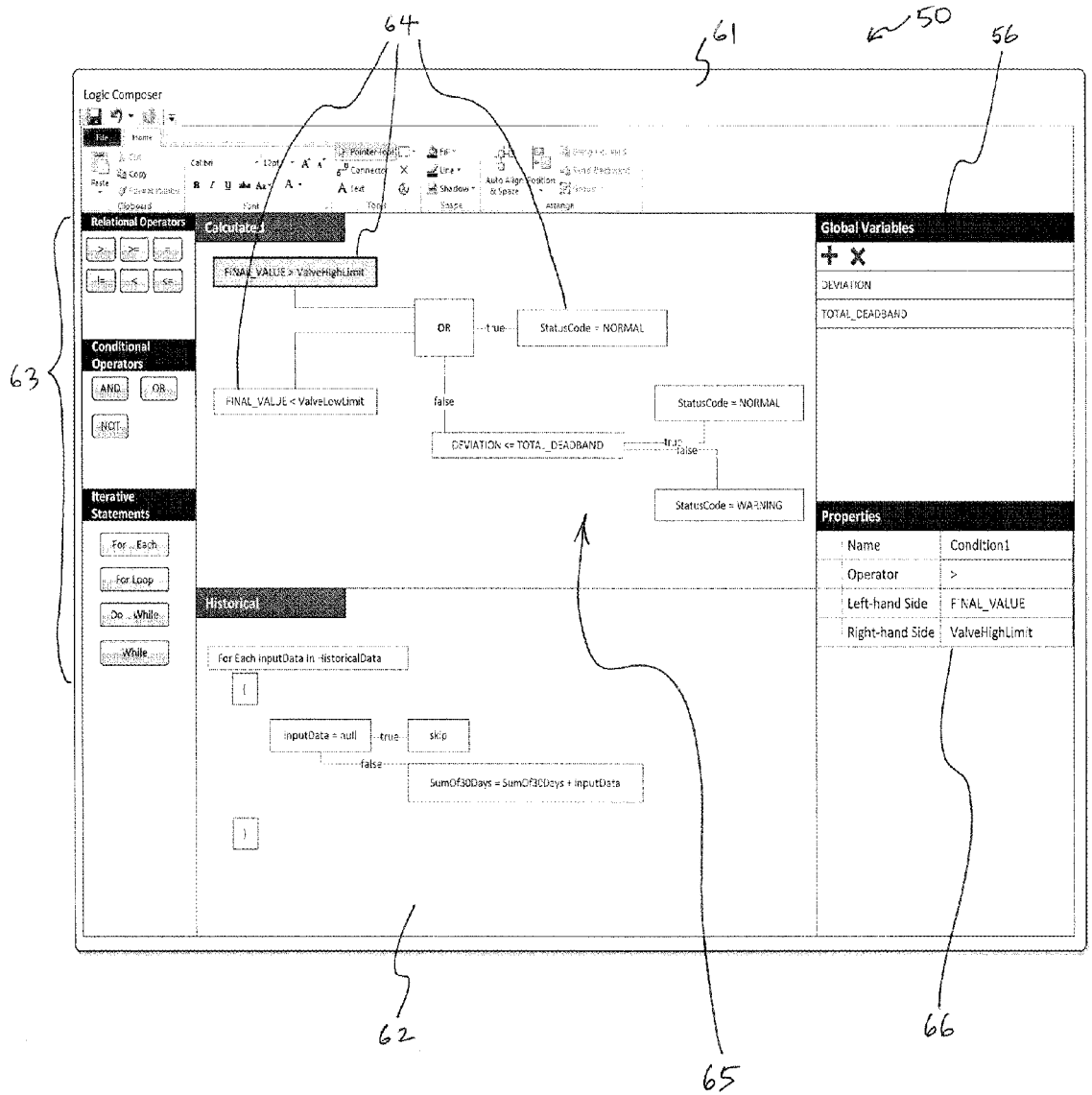

As shown in FIG. 4b, the logic module 61 of the logics composer 50 comprises a logic building area 62 in which variables 56 defined using the equation builder 51, parameters and constants may be placed by the user (for example using a drag-and-drop method) and connected using appropriate logical functions provided in a logic toolbox 63 to form logic blocks 64. The logic building area 62 is preferably divided by data type, such as calculated, historical, and so on. The logical functions provided in the logic toolbox 63 are configured to be manipulated via at least one user input device of the computer, such as a mouse and/or a keyboard, and may comprise relational operators, conditional operators and iterative statements. Any item in the logic building area 62 such as a logic block 64 is configured to be selectable for the user to edit properties of the selected item using a provided properties panel 66 in the logic module 61.

The logic module 61 is configured for a logical workflow 65 of a particular diagnostic to be graphically created using the logic blocks 64, thereby forming a logic output file. For example, a logical work flow given in the following text statements If (InputParam1>0) AND (InputParam2>0)

OutputParamX=InputParam1+InputParam2 may be readily graphically defined using the logic module 61.

The logic output file of the logic module 61 is subsequently input to a calculation engine that runs on the server 400 machine. Preferably, the calculation engine periodically executes logic output files from the logics composer 50, saving the results in the database 410 of the server 400.

The logic module 61 is also configured for the user to define different output parameters of different data types, wherein the data types may be real-time, calculated, threshold or historical. The logic module 61 is further configured for the user to define the logic for how each output parameter is calculated. Output parameters defined in the logic module 61 can then be used as input when defining a data source in the graphics builder 30.

Together, results and output arising from use of the logics composer 50 are stored in the database 410 as the information that is to be shown in the display area 126 on the client machine 200. The information is thus derived from the data from the industrial plant 1000 that has been processed by the logical functions edited by the logics composer 50.

When the diagnostics module that has been configured using the apparatus 10 is run, the information is drawn from the database 410 of the server 400 and shown in the customized display area 126 of the diagnostics module on the client machine 200.

The apparatus 10 may further comprise a diagnostic identity description module 70 that contains definitions used in the application module 20. The diagnostic identity description module 70 may comprise an XML file that contains attributes defining what each diagnostic is about. The diagnostic identity description module 70 is preferably configured to allow a user to define names of input parameters, output parameters, calculated parameters that are referenced by both the graphics builder 30 and the logics composer 50.

The apparatus 10 thus provides instant delivery of diagnostic applications by allowing users to create display areas 126 and logical functions 53 for immediate use on their client machines 200. The plant monitoring system is also made more flexible as the apparatus 10 allows users to customize their own diagnostics module without being dependent on the programmers of the system provider to configure the diagnostics module for them. Using the apparatus 10, users can create new diagnostics based on existing diagnostics, to add new parameters, change calculation logics and so on. With the apparatus 10, there is no need to wait for the programmers to provide new releases of the diagnostics module since a user can readily build a new diagnostic using the apparatus 10 whenever an idea or need for a new diagnostic arises.

Whilst there has been described in the foregoing description exemplary embodiments of the present invention, it will be understood by those skilled in the technology concerned that many variations in details of design, construction and/or operation may be made without departing from the present invention. For example, the equation builder 51 may comprise a simple text box for the user to key in formulas and equations on their own instead of having a graphical equation building interface. The logic module 61 may be configured to provide additional features such as support for looping constructs to allow certain calculations to be performed in an iterative manner, or to allow for creating a logical workflow in a top-to-bottom instead of a left-to-right manner. The logic module 61 may be further configured to allow variables 56 to be added or deleted, and upon selection of a variable 56 in the logic module, to launch the equation builder 51 in order to create expressions to calculate a result of the selected variable 56.

The invention claimed is:

1. An apparatus for configuring a diagnostics module for an industrial plant, the apparatus comprising:
    an application module configured to run on a computer, the application module comprising a graphics builder, the graphics builder comprising
        a workspace configured to present, on a monitor of the computer, a display area of a diagnostics module for an industrial plant, and
        graphics tools configured to be manipulated via at least one user input device of the computer for customization of how the display area is shown on a client machine on which the diagnostics module is run, the customization being created and saved as dynamic link library files dynamically loadable by the diagnostics module to direct how the display area is shown on the client machine.

2. The apparatus of claim 1, wherein the apparatus is configured to communicate with a data source for the industrial plant, the workspace is configured to read, from the data source, a list of parameters available to the user for selection, and the application module further comprises a logics composer configured for a user to edit logics used to select, from the list of available parameters, input parameters to derive information to be shown in the display area on the client machine.

3. The apparatus of claim 2, wherein the logics composer comprises an equation builder having an input area configured for editing an equation used in the logics and having editing tools configured to be manipulated via at least one user input device of the computer for editing the equation.

4. The apparatus of claim 3, wherein the logics composer further comprises a logic building area and a logic toolbox configured to be manipulated via at least one user input device of the computer for graphically building a logic block using an output variable defined by the equation and for graphically defining a logic workflow using the logic block.

5. The apparatus of claim 4, wherein the graphics builder is configured to link available parameters with a compatible data area.

6. The apparatus of claim 2, wherein the graphics builder is configured to allow customization of the display area to show information including real-time data, historical data, calculated data and threshold or manual data for equipment in the industrial plant.

7. The apparatus of claim 2, wherein the application module further comprises a diagnostic identity description module configured to contain definitions used in the application module.

8. The apparatus of claim 7, wherein the diagnostic identity description module is configured to allow a user to define names of input parameters, output parameters, calculated parameters that are referenced by the graphics builder and the logics composer.

9. The apparatus of claim 1, wherein the display area contains a number of data areas and customization is selected from at least one of the group consisting of: creating a data area, changing a size of a data area, moving a data area to a different location within the display area, changing a color of a data area, changing a font of text associated with a data area, changing a font size of text associated with a data area, and removing a data area.

* * * * *